United States Patent
Pandey et al.

(10) Patent No.: US 11,601,275 B2
(45) Date of Patent: *Mar. 7, 2023

(54) SYSTEM AND METHOD FOR IMPLEMENTING A TWO-SIDED TOKEN FOR OPEN AUTHENTICATION

(71) Applicant: PAYPAL, INC., San Jose, CA (US)

(72) Inventors: Gyanesh Pandey, Los Altos, CA (US); Gautam Madaan, Dublin, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,707

(22) Filed: Sep. 30, 2021

(65) Prior Publication Data

US 2022/0021539 A1 Jan. 20, 2022

Related U.S. Application Data

(63) Continuation of application No. 16/563,851, filed on Sep. 7, 2019, now Pat. No. 11,153,088.

(51) Int. Cl.
*H04L 9/32* (2006.01)
*H04L 9/06* (2006.01)
*H04L 9/08* (2006.01)

(52) U.S. Cl.
CPC .......... *H04L 9/3213* (2013.01); *H04L 9/0637* (2013.01); *H04L 9/083* (2013.01); *H04L 9/0825* (2013.01); *H04L 9/3273* (2013.01)

(58) Field of Classification Search
CPC ... H04L 9/3213; H04L 9/0637; H04L 9/0825; H04L 9/083; H04L 9/3273
See application file for complete search history.

(56) References Cited

U.S. PATENT DOCUMENTS

| | | | |
|---|---|---|---|
| 9,135,425 B2* | 9/2015 | Yau | H04W 12/06 |
| 9,374,369 B2* | 6/2016 | Mahaffey | G06F 21/6245 |
| 9,462,003 B2 | 10/2016 | Liu | |
| 10,102,510 B2* | 10/2018 | Yau | G06Q 20/3829 |
| 10,521,284 B2* | 12/2019 | McClory | G06F 9/45558 |
| 10,884,909 B1* | 1/2021 | Chatterjee | G06F 8/60 |
| 2016/0006743 A1* | 1/2016 | Liu | H04L 9/32 726/4 |
| 2018/0262512 A1* | 9/2018 | Zhao | H04L 63/102 |
| 2018/0321993 A1 | 11/2018 | McClory et al. | |
| 2019/0043043 A1 | 2/2019 | Saraniecki et al. | |

FOREIGN PATENT DOCUMENTS

WO 2013049461 A2 4/2013

* cited by examiner

*Primary Examiner* — Ayoub Alata
(74) *Attorney, Agent, or Firm* — Haynes and Boone, LLP

(57) ABSTRACT

A system and method for implementing a two-side token for OAUTH are described. A first request for access by a partner app server to user account information owned by a host server is received at a host auth server. Upon receiving authorization to share the user account information, a response is returned to the partner app sever. The response includes an access token. In response to returning the response to the partner app server, an event is written to an event queue. The event provides an indication that the request for access was received and that the corresponding response with the access token was returned. The event, when read by a host app server, instructs the host app server to submit a second request to a partner auth server for a reciprocal access token.

20 Claims, 4 Drawing Sheets

SYSTEM AND METHOD FOR IMPLEMENTING A TWO-SIDED TOKEN FOR OPEN AUTHENTICATION

RELATED APPLICATIONS

This application claims priority and the benefit to U.S. patent application Ser. No. 16/563,851, filed on Sep. 7, 2019, the entire disclosure of which is incorporated herein by reference.

TECHNICAL FIELD

The subject technology generally relates to open authorization and more particularly, relates to implementing a two-sided token to facilitate an open authentication (OAUTH) process.

BACKGROUND

Authorization of users have taken many forms over the years. Traditionally, when a user signs up for an account for any type of online service, the user provides some amount of his/her personal information (e.g., name, email address, etc.). Each service account signup is typically met with a new request for information. The advent of OAuth has facilitated this process to some degree by providing an open standard for access delegation. OAUTH allows an end user's account information to be used by third-party services without exposing the user's password. That is, with the authorization of the user, the OAUTH mechanism may share information from one of the user's account with a third party application or website. For example, a user may permit PayPal, Inc., to share the user's information with a third party application, such as a native application or website put out by a financial institution like Bank of America.

This sharing of information, however, occurs only in one direction (e.g., from PayPal to Bank of America) when authorized by the user. For example, this sharing of information is initiated when a request is sent, for example, by Bank of America to PayPal to obtain information about a user. An access token is returned from PayPal to Bank of America to grant access to certain information held bay PayPal. As indicated above, information only moves in one direction in this case—from PayPal to Bank of America.

Ostensibly, if a user approves sharing of information in one direction, the user will likely approve the sharing of information in the other direction as well. However, since only one access token is exchanged as a result of the request, the access is granted in only one direct. As such, there needs to be a mechanism that is capable of implementing a two-sided token to complete a bi-directional OAUTH exchange.

SUMMARY

According to various aspects of the subject technology, a system for implementing a two-side token for OAUTH is described. A first request for access by a partner app server to user account information owned by a host server is received at a host auth server. Upon receiving authorization to share the user account information, a response is returned to the partner app sever. The response includes an access token. In response to returning the response to the partner app server, an event is written to an event queue. The event provides an indication that the request for access was received and that the corresponding response with the access token was returned. The event, when read by a host app server, instructs the host app server to submit a second request to a partner auth server for a reciprocal access token.

According to various aspects of the subject technology, a method for implementing a two-side token for OAUTH is described. A first request for access by a partner app server to user account information owned by a host server is received at a host auth server. Upon receiving authorization to share the user account information, a response is returned to the partner app sever. The response includes an access token. In response to returning the response to the partner app server, an event is written to an event queue. The event provides an indication that the request for access was received and that the corresponding response with the access token was returned. The event, when read by a host app server, instructs the host app server to submit a second request to a partner auth server for a reciprocal access token.

According to various aspects of the subject technology, a non-transitory machine-readable medium having stored thereon machine-readable instructions executable for implementing a two-side token for OAUTH is described. A first request for access by a partner app server to user account information owned by a host server is received at a host auth server. Upon receiving authorization to share the user account information, a response is returned to the partner app sever indicating an authorization success. An access token is written to a host node of a host-partner shared blockchain. The access token, upon being written to the host node of the host-partner shared blockchain, is synced to a partner node of the host-partner shared blockchain. The access token, upon being synced to the partner node of the host-partner shared blockchain, is accessible to the partner app server. In response to writing the access token to the host node of the host-partner shared blockchain, an event is further written to an event queue. The event provides an indication that the request for access was received and that an access token was written to the host node of the host-partner shared blockchain. The event, when read by a host app server, instructs the host app server to submit a second request to a partner auth server for a reciprocal access token. The response includes an access token. In response to returning the response to the partner app server, an event is written to an event queue. The event provides an indication that the request for access was received and that the corresponding response with the access token was returned. The event, when read by a host app server, instructs the host app server to submit a second request to a partner auth server for a reciprocal access token.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

By utilizing OAUTH, application nowadays provide mechanism for sharing information across applications. For example, a user with a PayPal account may authorize PayPal to share the user's information with a third-party application or website. These third-party applications or websites may provide platforms on which money or other transactions may be conducted, e.g., banking applications.

While this sharing of information occurs in one direction (e.g., from PayPal to Bank of America), it can be broadly assumed that a user authorizes the sharing of information from a first party to a second, that the user would generally have no issues with the second user sharing information with the first. To accomplish the sharing of information in both directions, however, the user must login to each of his two accounts with the two different organizations, and individually authorize information to be shared by the other account. This process generates a token to be transmitted in each direction, e.g., from Bank of America to PayPal in one instance, and from PayPal to Bank of America in another instance.

In order to solve this problem of sharing two different tokens when a company like PayPal partners with a company like Bank of America, a token exchange process is proposed. Specifically, a process where both parties issue a token during a single user journey is proposed so that the organizations do not have to ask the user to go through a separate journey for a second token exchange.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
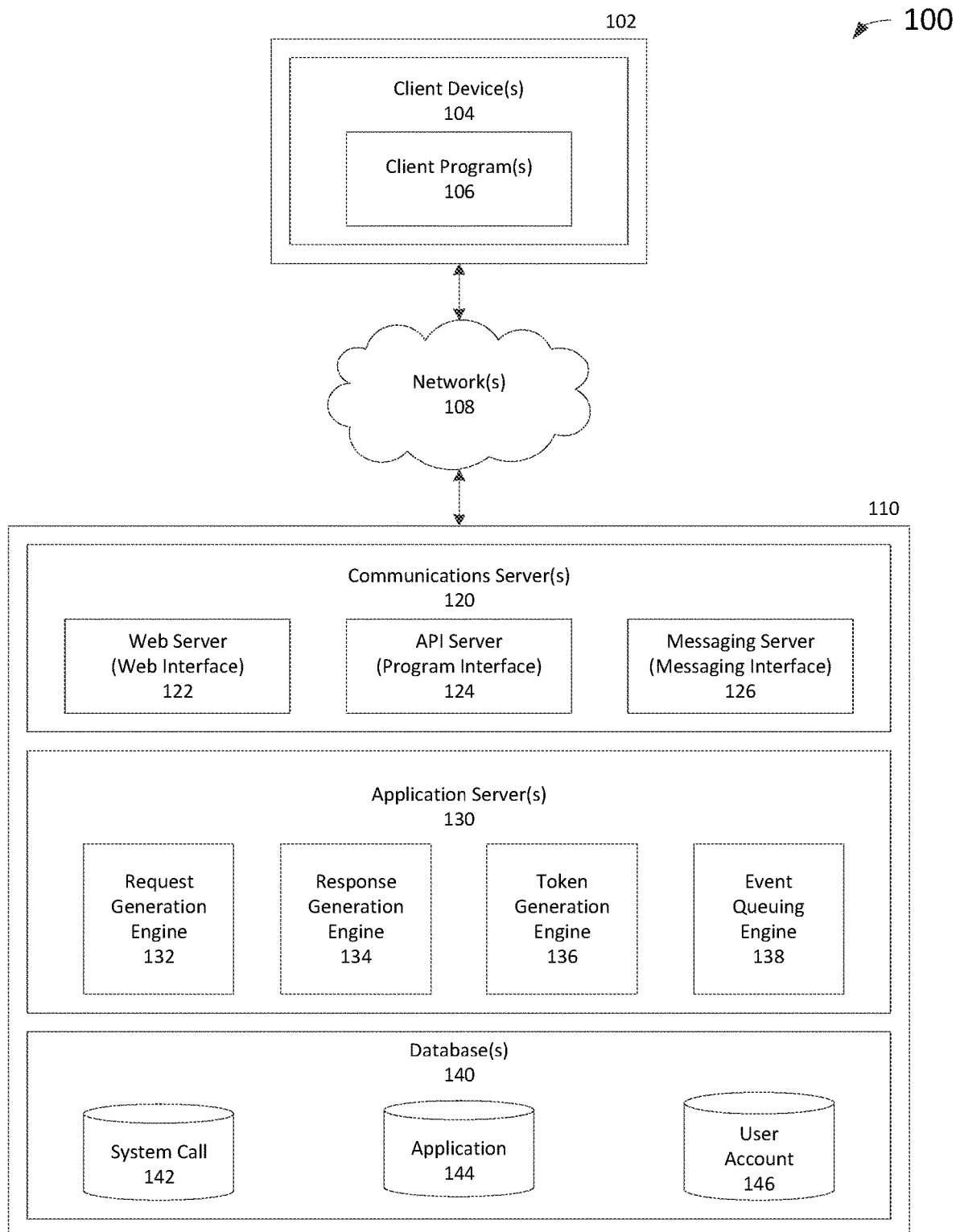
FIG. 1 is a block diagram of an exemplary computing system on which the implementation of a two-side token for OAUTH may be performed.

FIG. 1 is a block diagram of an exemplary computing system on which the implementation of a two-side token for OAUTH may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MIMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services such as tools for verifying URLs based on information collected about customers. Application servers 130 may include multiple servers and/or components. For example, application servers 130 may include a request generation engine 132, response generation engine 134, token generation engine 136, and/or event queuing engine 138. These servers and/or components, which may be in addition to other servers, may be structured and arranged to implement a two-side token for OAUTH.

Application servers 130, in turn, may be coupled to and capable of accessing one or more databases 140 including system call database 142, application database 144, and/or user account database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
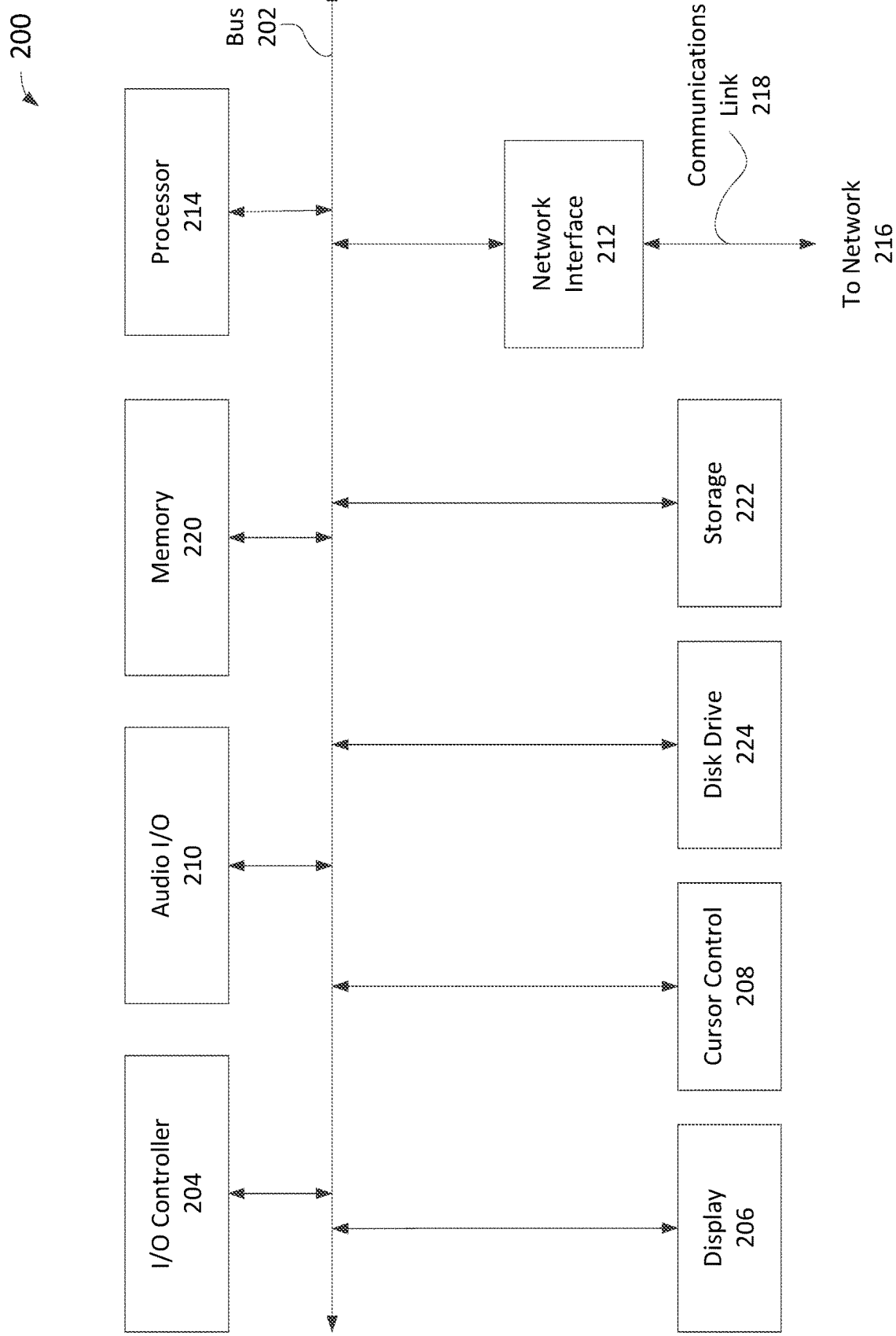
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
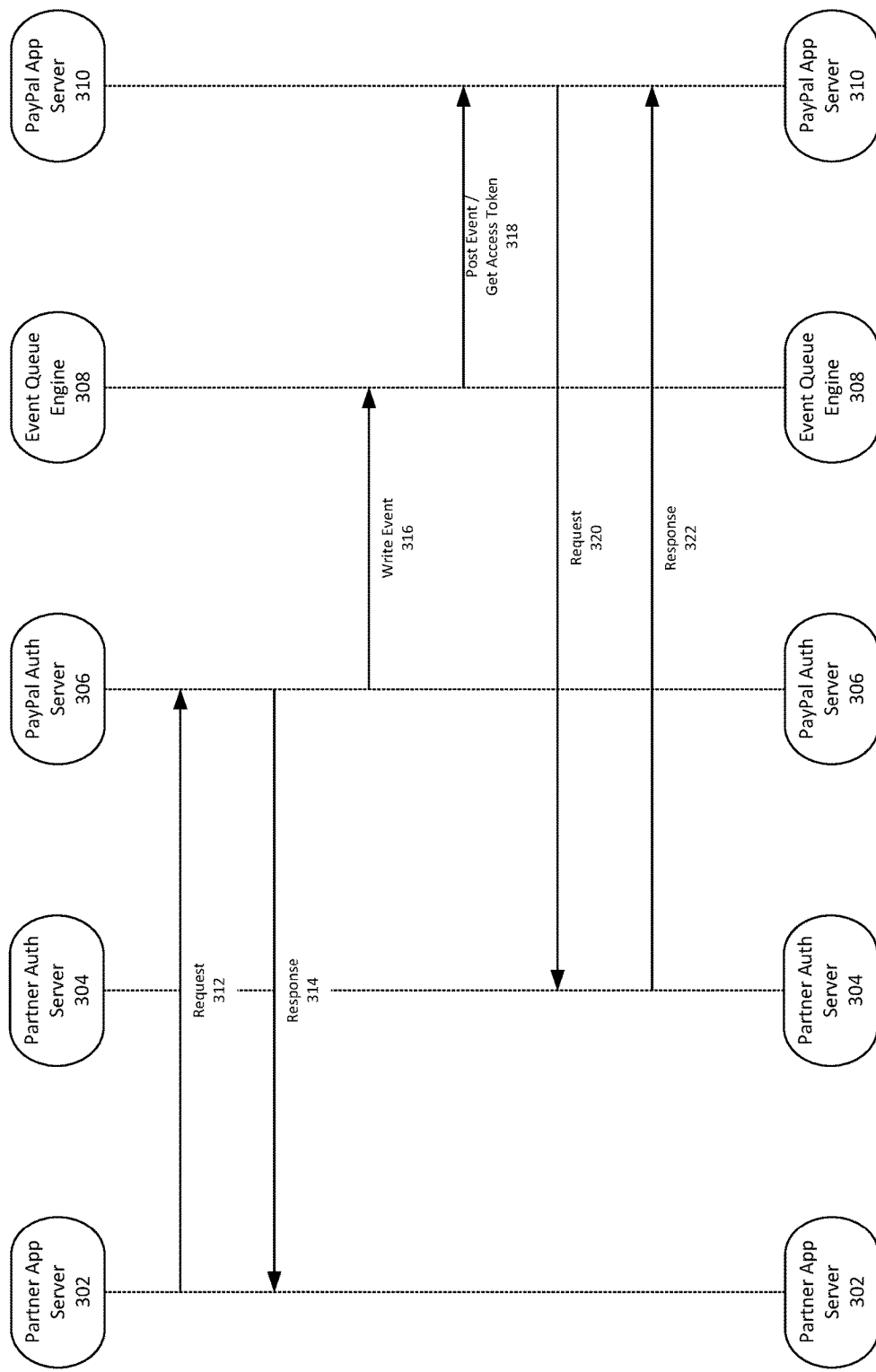
FIG. 3 illustrates an exemplary process 300 for implementing a two-side token for OAUTH.

FIG. 3 illustrates an exemplary process 300 for implementing a two-side token for OAUTH is described. Continuing the example described above, the steps in FIG. 3 is described from the perspective of an authorization server 306 managed by the party (e.g., PayPal) that's providing the user's account information to a partner (e.g., Bank of America). In step 312, a request is sent from the partner app server 302 to the PayPal auth server 306. This request, which may include a client identification, a client secret, an indication of commons scopes, and an indication for two-way authorization, seeks authorization from the PayPal auth server 306 to access certain user information. This action may occur when, for example, a user wishes to link his PayPal account to his Bank of America account. An option to link the account may first be provided by Bank of America, whether via a Bank of America application or through Bank of America's website. Once prompted by the user to link PayPal back to his Bank of America account, a request is sent from the partner (i.e., Bank of America) app server 302 to the PayPal auth server 306.

In some embodiments, the PayPal auth server 306 will verify that a two-way authorization is permissible based on a partner profile. For example, PayPal must determine that its partner (e.g., Bank of America) has the authority to request two-way authorization PayPal. Alternatively or additionally, the two-way authorization verification may be determined based on a particular user account. In some instances, a user's preference may be taken into account whether or not two-way authorization will be permitted for that user's account.

In some embodiments, a request is issued by PayPal to authorize this exchange. For example, the user may already be logged into his PayPal account (e.g., either on the browser being operated or within a native application running on a mobile device, which the user is also logged into), so no additional authentication would be required unless a predefined rule triggers additional security via the PayPal application or browser. Alternatively, if the user is not already logged in, the user may be prompted to enter credentials before an authorization occurs.

Once authorized, a response is returned from the PayPal auth server 306 to the partner app sever 302 in step 314. This response includes an access token that, when in possession of the partner, may be used by the partner to access certain user account information. The limitations to the access (i.e., an indication of what information the partner has access to) is defined by the common scopes indicated in the request. As such, the partner may not have free reign over all of the user's account information in PayPal's possession unless the partner is authorized to have it.

Concurrent to the PayPal auth server 306 sending the response to the partner app server 302, the response is written to an event queue engine 308 in step 316. In some instances, the PayPal auth server 306 detects that the request provided an indication that a two-way authorization is being sought, and thus triggering the write operation. The event includes an identification of the partner and the common scopes. The event may further include an indication that the PayPal auth server 306 has provided a token to the partner app server 302, and that a two-way authorization is being sought.

The event queue is accessible by multiple other applications within PayPal. For example, the PayPal app server 310 may be listening in on the event queue for certain events. In this case, the PayPal app server 310 may detect, in step 318, that a response including an access token was sent from the PayPal auth server 306 to the partner app server 302. That the request included a two-way authorization may also be detected. In some embodiments, the event posted may be a message, that when picked up by the PayPal app server 310, suggesting a request be sent to the partner auth server 304 for a reciprocal access token. As such, a request is sent from the PayPal app server 310 to the partner auth server 304. This request may similarly include a client identification, a client secret, and common scopes. What differs from the previous request, however, is that this request will not indicate a two-way authorization since this request is the back end of that two-way authorization.

As indicated above, the common scope provides a definition of how much user account information PayPal will make available to a partner. In some embodiments, when a two-sided token is generated, the scopes are symmetrical. In other words, whatever fields of information that's shared by PayPal to its partner will be shared back by the partner to PayPal. This symmetry can be particularly useful because different individuals may use different accounts for different purposes. For example, if a two-sided token is created to cross-share information between a user's Facebook and Linkedin accounts, the different types of information offered by each may, in combination, build a fairly comprehensive profile, where Facebook provides data that's more socially oriented where as Linkedin provides profession oriented information.

Alternatively, the token may define different levels of access provided by each partner to a corresponding partner. For instance, a user may not want to share his Linkedin connections with his Facebook account if the user does not wish to add his contacts from a professional forum to his contacts in a social forum. As such, the user may define what the token looks like from a common scopes perspective, and this relationship may be asymmetrical in nature.

In some embodiments, the client identification and client secret may be unique to each party. For example, PayPal will have one set of client identifications and client secrets while the partner has another set unique from PayPal's. As such, in order for this process to be accomplished, the partners are required to have certain amount of information from each other because the client identifications and client secrets are generally specific to an organization.

In some embodiments, a third-party authorization server that's common to PayPal and its partner(s) can be used to generate the token. For example, the authorization server may generates and maintains the common token. One characteristic of the common token is that both PayPal and its partner can decode the access token, and from the access token, determine who the client is and what are the common scopes shared by the two partners.

Figure 4:
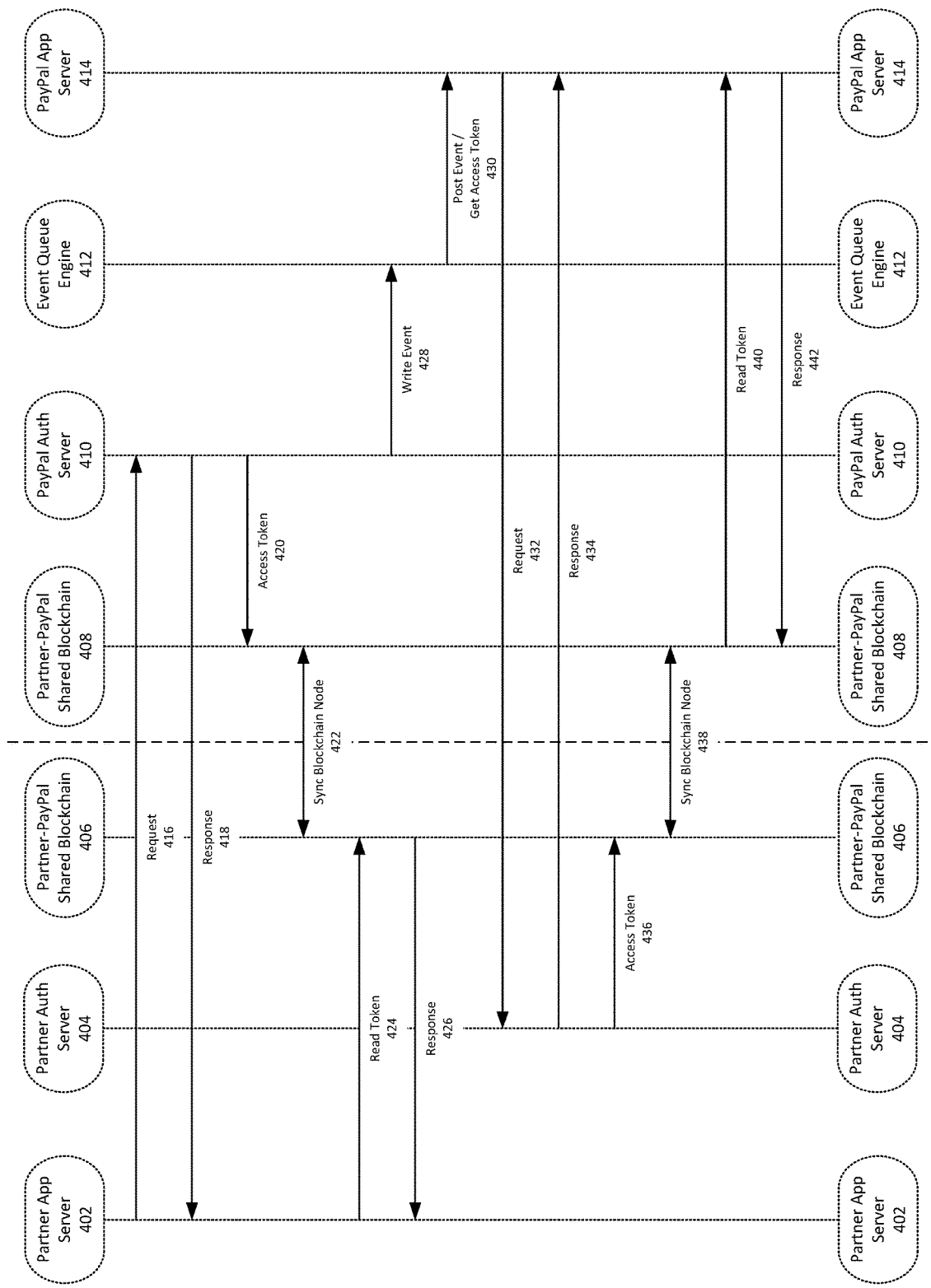
FIG. 4 illustrates an alternative exemplary process 300 for implementing a two-side token for OAUTH using a blockchain.

Instead of using a third-party authorization, a blockchain-based approach may alternatively be contemplated. In this approach again, both the parties issue a token each, but they are written to a Partner-PayPal blockchain that must be synced. FIG. 4 illustrates an alternative exemplary process 400 for implementing a two-side token for OAUTH using a blockchain. The blockchain-based approach is substantially similar to the process described in FIG. 3, except that instead of sending the access token from one party's auth server to another party's app server, the token is written to a blockchain. For example, in step 416, a request is sent from the partner app server 402 to the PayPal auth server 410. This request, which may include a client identification, a client secret, an indication of commons scopes, and an indication for two-way authorization. In addition, the request may include a shared user identification that's used to uniquely identify the user on the blockchain.

As indicated above in reference to FIG. 3, the partner seeks authorization from the PayPal auth server 410 to access certain user information. This action may occur when a user wishes to link his PayPal account to a partner account (e.g., user's Bank of America account). The request is sent from the partner (i.e., Bank of America) app server 402 to the PayPal auth server 410 when prompted by the user to link the two accounts.

Once authorized, a response is returned from the PayPal auth server 410 to the partner app sever 402 in step 418, indicating a successful authorization. Concurrently with the sending of the response, the PayPal auth server 410 also writes an access token onto the PayPal node of the Partner-PayPal shared blockchain 408 in step 420. After the access token is written to the PayPal node of the Partner-PayPal shared blockchain, the blockchain is synced with the partner node of the Partner-PayPal shared blockchain 406 in step 422. In some embodiments, this syncing may occur on a periodic basis. Alternatively, the syncing may be performed each time data is written to the Partner-PayPal shared blockchain.

Once synced, the access token is read by the partner app server 402 off the partner node of the Partner-PayPal shared blockchain 406 in step 424. Each of the access tokens written to the Partner-PayPal shared blockchain may include some information that facilitates identification of who the access refers to. For example, the access token may include some combination of the client identification, the client secret and the shared user identification. In reading the blockchain, the partner app server 402 is able to obtain the access token from the partner node of the Partner-PayPal shared blockchain 406 in step 426.

At or around the same time that the access token is written to the PayPal node of the Partner-PayPal shared blockchain 408, an event is written by the PayPal auth server 410 to the event queue engine 412. The event that's written includes a partner identification and the commons scopes, and may provide an indication that the PayPal auth server 410 has provided a token to the PayPal node of the Partner-PayPal shared blockchain 408, and that a two-way authorization is being sought.

The PayPal app server 414 may detect, in step 430, that a response including an access token was sent from the PayPal auth server 410 to the PayPal node of the Partner-PayPal shared blockchain 408. That the request included a two-way authorization may also be detected. As such, a request is sent from the PayPal app server 414 to the partner auth server 404. This request may similarly include a client identification, a client secret, a shared user identification, and common scopes. This request will, however, indicate that a two-way authorization is not being sought since this request is the back end of that two-way authorization.

Upon receipt of the request from the PayPal app server 414, a response is returned from the partner auth server 404 to the PayPal app sever 414 in step 434, indicating a successful authorization. Concurrently with the sending of the response, the partner auth server 404 also writes an access token onto the partner node of the Partner-PayPal shared blockchain 406 in step 436. After the access token is written to the partner node of the Partner-PayPal shared blockchain, the blockchain is synced with the PayPal node of the Partner-PayPal shared blockchain 408 in step 438.

Once synced, the access token is read by the PayPal app server 414 off the PayPal node of the Partner-PayPal shared blockchain 408 in step 440. Each of the access tokens written to the Partner-PayPal shared blockchain may, as indicated above, include some information that facilitates identification of who the access refers to. For example, the access token may include some combination of the client identification, the client secret and the shared user identification. In reading the blockchain, the PayPal app server 414 is able to obtain the access token from the PayPal node of the Partner-PayPal shared blockchain 408 in step 442. Once the access tokens have been obtained by PayPal and the partner, user account information may be traded between PayPal and the partner limited only by the common scopes.

One advantage of writing the access tokens to a common blockchain is that the access tokens are not sent over the wire. In other words, access tokens are not sent over a standard hypertext transfer protocol (http) response. Furthermore, the access token is not placed in the control of either party. These elements provide additional elements of security that aren't necessarily available over convention channels of communication.

While the above description is provided with PayPal as the central organization to the exchange of tokens, authorization, and information, it can be appreciated that this process may be applied/adapted to any two or more partner organizations that possess user account information and want to share such information. For example, Facebook may provide an authorization tool to a third-party so that the third-party wouldn't have to build its own authorization tool. As long as the third-party considers Facebook a trusted source, it can choose to rely on Facebook for authorization.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A host authorization server system for implementing a two-side token for open authorization (OAUTH) comprising:

a non-transitory memory storing instructions; and one or more hardware processors coupled to the non-transitory memory and configured to read the instructions from the non-transitory memory to cause the system to perform operations comprising:

determining, in response to a first request from a partner application server for access to a first user account information for a user account maintained by a host authorization server, an authorization to share the first user account information by the host authorization server, wherein the first user account information includes multiple levels of access;

returning, upon determining the authorization to share the first user account information, an access token to the partner application server, wherein the access token is usable by the partner application server to access the first user account information at a first level of the multiple levels of access; and causing, in response to returning the access token to the partner application server, a submission, from a host application server associated with the host authorization server to a partner authorization server associated with the partner application server, a second request for a reciprocal access token, wherein the reciprocal access token is usable by the host application server to access a second user account information for the user account maintained by a partner server at a second level of the multiple levels of access.

2. The host authorization server system of claim 1, wherein causing the submission of the second request for the reciprocal access token comprises writing an event to an event queue, wherein the event, when read by the host application server, causes the second request for the reciprocal access token to be submitted to the partner authorization server.

3. The host authorization server system of claim 2, wherein the event provides an indication that the first request for access was received and that the corresponding response with the access token was returned.

4. The host authorization server system of claim 1, wherein the second level of the multiple levels of access is different from the first level of the multiple levels of access.

5. The host authorization server system of claim 4, wherein the multiple levels of access correspond to multiple levels of security sensitivity of the first and second user account information, the multiple levels of security usable to determine an amount of the first user account information accessible to the partner application server, and an amount of the second user account information accessible to the host application server.

6. The host authorization server system of claim 1, wherein each of the first and second requests include at least one of a client identification, a client secret, an indication of common scopes, and an indication for two-way authorization.

7. The host authorization server system of claim 6, wherein the first level of the multiple levels of access is defined by a first common scope of the first request, and wherein the second level of the multiple levels of access is defined by a second common scope of the second request.

8. The host authorization server system of claim 7, wherein the first and second common scopes are asymmetrical.

9. The host authorization server system of claim 7, wherein the common scopes are determinable by an owner of the user account.

10. A method for implementing a two-side token for open authorization (OAUTH) comprising:

determining, in response to a first request from a partner application server for access to a first user account information for a user account maintained by a host authorization server, an authorization to share the first user account information by the host authorization server, wherein the first user account information includes multiple levels of access;

returning, upon determining the authorization to share the first user account information, a response to the partner application server indicating an authorization success;

writing an access token to a host node of a host-partner shared blockchain, wherein the access token, upon being written to the host node of the host-partner shared blockchain, is synced to a partner node of the host-partner shared blockchain, and wherein the access token, upon being synced to the partner node of the host-partner shared blockchain, is made accessible to the partner application server, the access token being usable by the partner application server to access the first user account information at a first level of the multiple levels of access;

causing, in response to writing the access token to the host node, a submission, from a host application server associated with the host authorization server to a partner authorization server associated with the partner application server, a second request for a reciprocal access token, wherein the reciprocal access token is usable by the host application server to access a second user account information for the user account maintained by a partner server at a second level of the multiple levels of access.

11. The method of claim 10, wherein causing the submission of the second request for the reciprocal access token comprises writing an event to an event queue, wherein the event, when read by the host application server, causes the second request for the reciprocal access token to be submitted to the partner authorization server.

12. The method of claim 11, wherein the event provides an indication that the first request for access was received and that the corresponding response indicating the authorization success was returned.

13. The method of claim 10, wherein the partner authorization server, in response to receiving the second request, writes the reciprocal access token to the partner node of the host-partner shared blockchain.

14. The method of 13, wherein the reciprocal access token, upon being written to the partner node of the host-partner shared blockchain, is synced to a host node of the host-partner shared blockchain, and wherein the reciprocal access token, upon being synced to the host node of the host-partner shared blockchain, is accessible to the host application server.

15. The method of claim 10, wherein the second level of the multiple levels of access is different from the first level of the multiple levels of access.

16. The method of claim 15, wherein the multiple levels of access correspond to multiple levels of security sensitivity of the first and second user account information, the multiple levels of security usable to determine an amount of the first user account information accessible to the partner application server, and an amount of the second user account information accessible to the host application server.

17. A non-transitory machine-readable medium having stored thereon machine-readable instructions executable to cause performance of operations comprising:

determining, in response to a first request from a partner application server for access to a first user account information for a user account maintained by a host authorization server, an authorization to share the first user account information by the host authorization server, wherein the first user account information includes multiple levels of access;

returning, upon determining the authorization to share the first user account information, an access token to the partner application server, wherein the access token is usable by the partner application server to access the first user account information at a first level of the multiple levels of access; and causing, in response to returning the access token to the partner application server, a submission, from a host application server associated with the host authorization server to a partner authorization server associated with the partner application server, a second request for a reciprocal access token, wherein the reciprocal access token is usable by the host application server to access a second user account information for the user account maintained by a partner server at a second level of the multiple levels of access.

18. The non-transitory machine-readable medium of claim 17, wherein causing the submission of the second request for the reciprocal access token comprises writing an event to an event queue, wherein the event, when read by the host application server, causes the second request for the reciprocal access token to be submitted to the partner authorization server.

19. The non-transitory machine-readable medium of claim 18, wherein the event provides an indication that the first request for access was received and that the corresponding response with the access token was returned.

20. The non-transitory machine-readable medium of claim 17, wherein the second level of the multiple levels of access is different from the first level of the multiple levels of access.

\* \* \* \* \*